(12) United States Patent
Ross et al.

(10) Patent No.: US 10,595,012 B2
(45) Date of Patent: Mar. 17, 2020

(54) REPRESENTATIONS OF EVENT NOTIFICATIONS IN VIRTUAL REALITY

(71) Applicant: Google LLC, Mountain View, CA (US)

(72) Inventors: Christopher Ross, New York, NY (US); Ian MacGillivray, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 43 days.

(21) Appl. No.: 15/811,055

(22) Filed: Nov. 13, 2017

(65) Prior Publication Data

US 2018/0160105 A1      Jun. 7, 2018

Related U.S. Application Data

(60) Provisional application No. 62/429,462, filed on Dec. 2, 2016.

(51) Int. Cl.
| | | |
|---|---|---|
| *G06F 3/01* | (2006.01) | |
| *G06F 9/54* | (2006.01) | |
| *H04L 12/58* | (2006.01) | |
| *H04N 13/344* | (2018.01) | |
| *G06F 1/16* | (2006.01) | |
| *G02B 27/01* | (2006.01) | |

(52) U.S. Cl.
CPC ....... *H04N 13/344* (2018.05); *G02B 27/0172* (2013.01); *G06F 1/163* (2013.01); *G06F 3/011* (2013.01); *G06F 9/542* (2013.01); *H04L 51/24* (2013.01)

(58) Field of Classification Search
CPC ....... H04N 13/344; G06F 1/163; G06F 3/011; G06F 9/542; H04L 51/24; G02B 27/0172
See application file for complete search history.

(56) References Cited

U.S. PATENT DOCUMENTS 5,838,775 A * 11/1998 Montalbano .......... H04M 1/247
                                                    379/93.23
8,874,665 B2 * 10/2014 Peterson ................ G06Q 50/01
                                                      709/206

(Continued)

FOREIGN PATENT DOCUMENTS

CN        106126021 A     11/2016
WO        2015102464 A1    7/2015

OTHER PUBLICATIONS

International Search Report and Written Opinion for International Application No. PCT/US2017/061575, dated Feb. 27, 2018, 15 pages.

(Continued)

*Primary Examiner* — Mihir K Rayan
(74) *Attorney, Agent, or Firm* — Brake Hughes Bellermann LLP

(57) ABSTRACT

According to an example implementation, a method may include receiving, from a non-virtual reality application, a non-virtual reality event notification, and providing, in a virtual environment based on the non-virtual reality event notification, a non-textual indication of a status of the non-virtual reality application, wherein a characteristic of the non-textual indication is adjusted to indicate the status of the non-virtual reality application.

18 Claims, 7 Drawing Sheets

(56) References Cited

U.S. PATENT DOCUMENTS

| | | |
|---|---|---|
| 2005/0071770 A1* | 3/2005 | Ho .................. G06F 3/0481 |
| | | 715/765 |
| 2005/0188320 A1* | 8/2005 | Bocking ............. G06F 3/0482 |
| | | 715/752 |
| 2009/0100352 A1 | 4/2009 | Huang et al. |
| 2010/0245237 A1 | 9/2010 | Nakamura |
| 2012/0150970 A1* | 6/2012 | Peterson ............ G06F 3/04817 |
| | | 709/206 |
| 2013/0050199 A1 | 2/2013 | Chavez |
| 2014/0111415 A1 | 4/2014 | Gargi et al. |
| 2015/0283460 A1 | 10/2015 | Huang et al. |
| 2016/0063766 A1* | 3/2016 | Han .................. G02B 27/017 |
| | | 345/633 |
| 2016/0124499 A1* | 5/2016 | Shiu ................. G06F 3/011 |
| | | 715/778 |
| 2016/0274662 A1 | 9/2016 | Rimon et al. |

OTHER PUBLICATIONS

Paneels et al.; "Review of Designs for Haptic Data Visualization"; IEEE Transactions on Haptics, vol. 3, No. 2, Apr.-Jun. 2010; pp. 119-137.

* cited by examiner

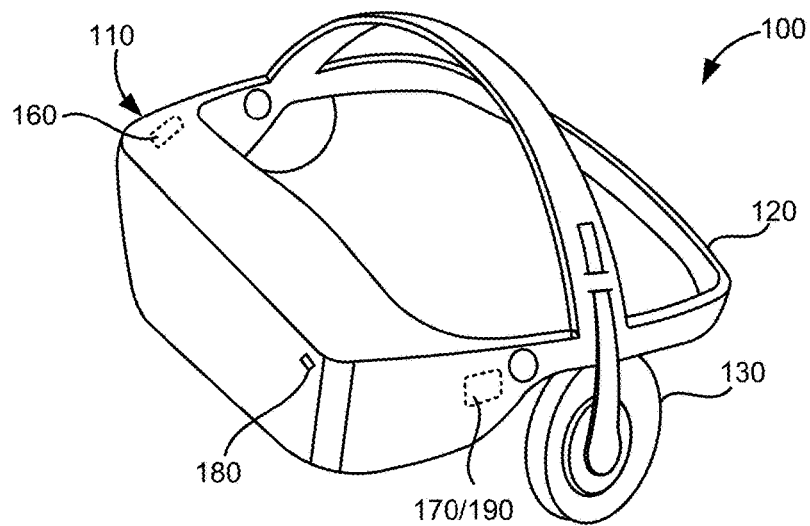
FIG. 2A
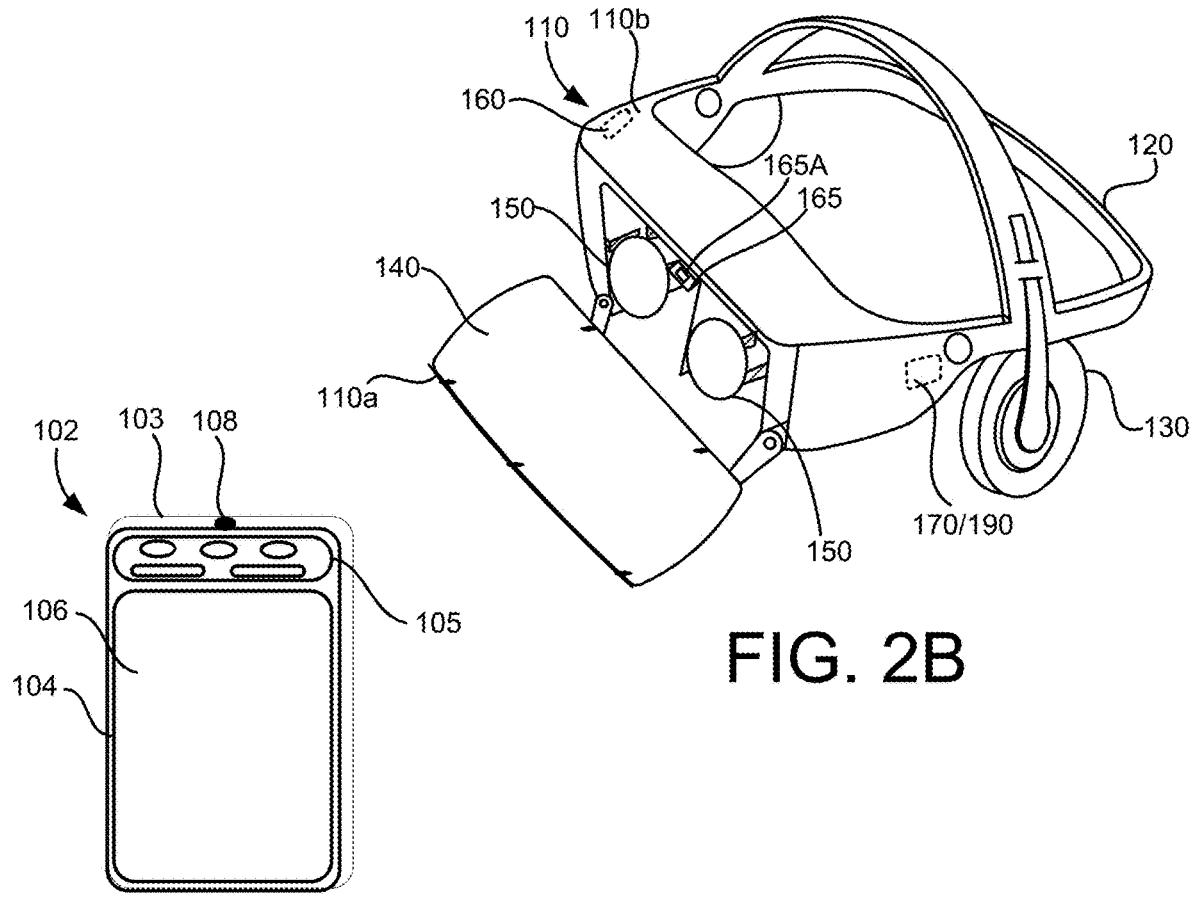
FIG. 2B
FIG. 2C

REPRESENTATIONS OF EVENT NOTIFICATIONS IN VIRTUAL REALITY

RELATED APPLICATION

This application claims the priority benefit of U.S. Provisional Patent Application No. 62/429,462, filed on Dec. 2, 2016, and entitled "REPRESENTATIONS OF EVENT NOTIFICATIONS IN VIRTUAL REALITY," the entirety of which is incorporated herein by reference.

FIELD

This relates, generally, to an augmented and/or virtual reality environment, and in particular, to various representations of event notifications in virtual reality.

BACKGROUND

An augmented reality (AR) and/or a virtual reality (VR) system may generate a three-dimensional (3D) immersive virtual environment. A user may experience this 3D immersive virtual environment through interaction with various electronic devices, such as, for example, a helmet or other head mounted device including a display, glasses or goggles that a user looks through when viewing a display device, gloves fitted with sensors, external handheld devices that include sensors, and other such electronic devices. Once immersed in the 3D virtual environment, the user may move through the virtual environment and move to other areas of the virtual environment, through physical movement and/or manipulation of an electronic device to interact with the virtual environment and personalize interaction with the virtual environment.

SUMMARY

In one aspect, a method may include receiving, from a non-virtual reality application, a non-virtual reality event notification, and providing, in a virtual environment based on the non-virtual reality event notification, a non-textual indication of a status of the non-virtual reality application, wherein a characteristic of the non-textual indication is adjusted to indicate the status of the non-virtual reality application.

In another aspect, a system may include a computing device configured to generate an immersive virtual environment. The computing device may include a memory storing executable instructions, and a processor configured to execute the instructions. Execution of the instructions may cause the computing device to receive, from a non-virtual reality application, a non-virtual reality event notification, and provide, in a virtual environment based on the non-virtual reality event notification, a non-textual indication of a status of the non-virtual reality application, wherein a characteristic of the non-textual indication is adjusted to indicate the status of the non-virtual reality application.

In one aspect, a method may include receiving a non-virtual reality event notification that indicates an occurrence of an event in a non-virtual reality application, the non-virtual reality event notification indicating an event type and a quantity of events, and displaying, in a virtual environment based on the non-virtual reality event notification, a non-textual indication including one or more virtual objects, wherein a quantity of the displayed virtual objects is based on the quantity of events.

In another aspect, a system may include a computing device configured to generate an immersive virtual environment. The computing device may include a memory storing executable instructions, and a processor configured to execute the instructions. Execution of the instructions may cause the computing device to receive a non-virtual reality event notification that indicates an occurrence of an event in a non-virtual reality application, the non-virtual reality event notification indicating an event type and a quantity of events, and displaying, in a virtual environment based on the non-virtual reality event notification, a non-textual indication including one or more virtual objects, wherein a quantity of the displayed virtual objects is based on the quantity of events.

The details of one or more implementations are set forth in the accompanying drawings and the description below. Other features will be apparent from the description and drawings, and from the claims.

BRIEF DESCRIPTION OF THE DRAWINGS

FIGS. 2A and 2B are perspective views of an example head mounted display device, and FIG. 2C illustrates an example handheld electronic device, in accordance with implementations described herein.

DETAILED DESCRIPTION

Figure 1A:
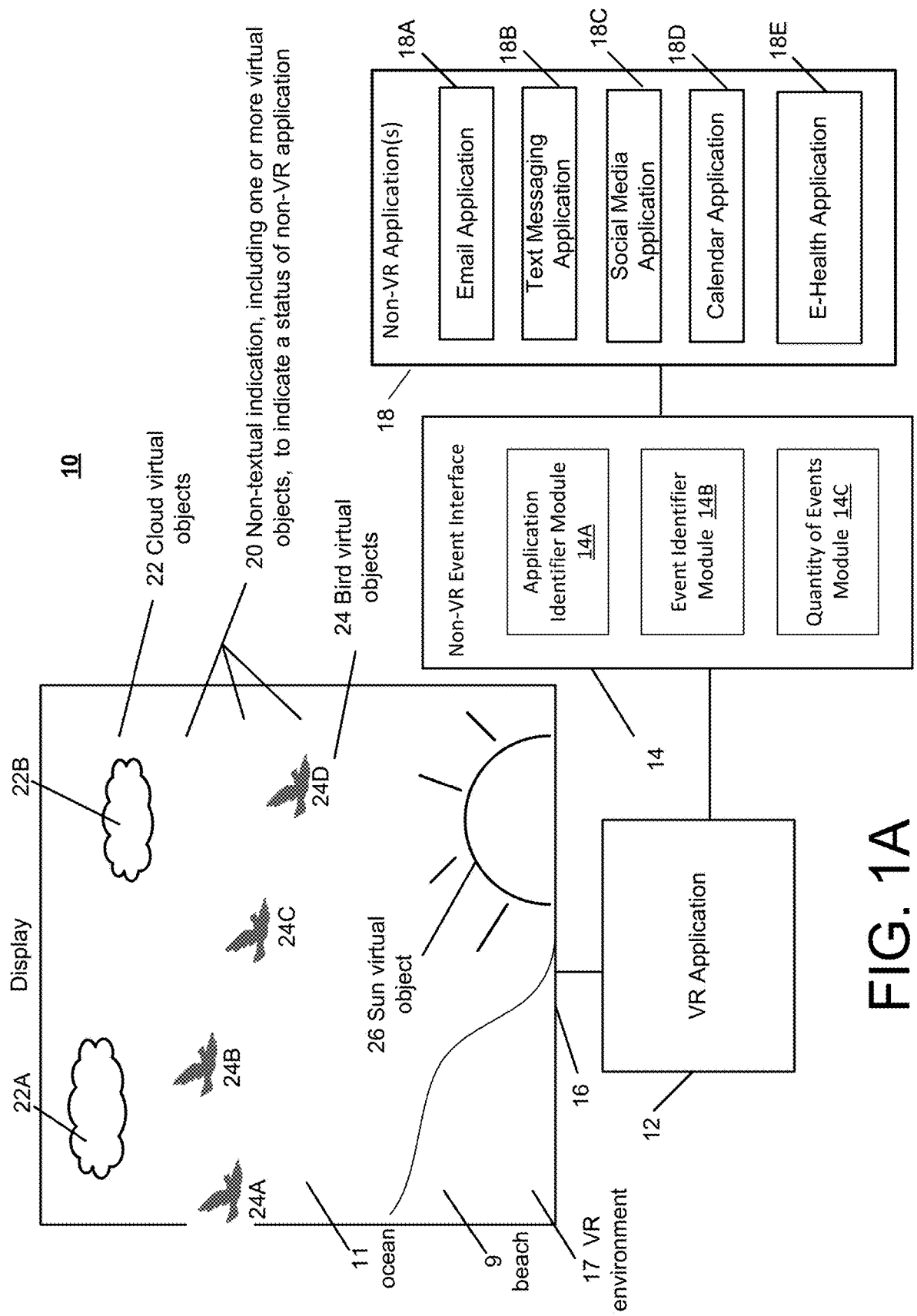
FIG. 1A is a diagram illustrating a computing system according to an example implementation.

A user immersed in a 3D augmented and/or virtual reality environment wearing, for example, a head mounted display (HMD) device may explore the 3D virtual environment and interact with the 3D virtual environment through various different types of inputs. These inputs may include, for example, physical interaction including, for example, manipulation of an electronic device separate from the HMD such as, for example, via a ray or beam emitted by the electronic device and/or a virtual beam rendered in the virtual environment based on the manipulation of the electronic device, a movement of the electronic device, a touch applied on a touch sensitive surface of the electronic device and the like, and/or manipulation of the HMD itself, and/or hand/arm gestures, head movement and/or head and/or eye directional gaze and the like. A user may implement one or more of these different types of interactions to execute a particular action in the virtual environment, such as, for example, moving through the virtual environment, and moving, or transitioning, or teleporting, from a first area of the virtual environment to a second area of the virtual environment, or from a first virtual environment to a second virtual environment.

According to an illustrative example implementation, a user of a VR (virtual reality) system may be completely immersed or have a complete immersion in the VR world or VR environment. For example, with the complete immersion of a user within a VR environment, it can be very easy for a user to lose all track of time and real-world needs and events, such as upcoming meetings or appointments, an important message that was just received, a change in a user's health status, etc. However, the user may wish to be notified of certain events for (or generated by) one or more non-VR applications. According to an example implementation, traditional pop-up window that may include text may be used to communicate non-VR events to the VR user, but such a pop-up window may frequently break or disrupt the VR immersion of the user. Therefore, it may be desirable, at least in some cases or for some illustrative example implementations, to, e.g., notify the user of non-VR event(s) without breaking or disrupting the VR immersion or while breaking or disrupting the VR immersion less than a traditional text based notifier would.

According to an example implementation, a virtual reality (VR) application, which may be part of a computing system or a VR system, may generate a virtual environment (or a virtual world). In addition to a VR application that provides an immersive 3D augmented and/or virtual reality environment, the computing system or a VR system may include one or more non-virtual reality (non-VR) applications running on the computing system, such as, e.g., an email application, a text messaging application, a social media application, a calendar application, an e-health application, etc. Each of these non-VR applications may generate or receive updated status information that is unrelated to the VR application or the VR environment, for example. While the user is engaged in a VR session, it may be useful to provide (e.g., display) information within the virtual environment that indicates a status (or updated status information) for one or more of these non-VR applications. According to an example implementation, a non-textual indication of a status of a non-virtual reality application may be provided (e.g., displayed) within the virtual environment or virtual world. Also, according to an illustrative example implementation, at least in some cases, a non-textual indication of a status of the non-VR application may be provided that may be integrated with the virtual environment or which is consistent with a theme of the virtual environment. Also, for example, the non-textual indication of the status of the non-VR application may include one or more virtual objects (e.g., graphical or non-textual virtual objects) that are provided or displayed within the virtual environment. The purpose of these virtual object(s) may be to communicate a status (or status update information) of a non-VR application, e.g., such as to communicate a number of new or pending emails, text messages, social media messages or feeds, an upcoming calendar item, a current health status or a change in a health status of the user, or other non-VR information that the user may wish to receive or view while engaged or involved in an immersive 3D VR session (e.g., while playing a VR game or VR activity). For example, a characteristic (e.g., quantity, color, size, location, volume, brightness, etc.) of the non-textual indication (e.g., a characteristic of one or more virtual objects) may be adjusted to indicate or communicate to a user a status of the non-virtual reality (non-VR) application.

According to an example implementation, the display of non-textual indication(s) to indicate a status of a non-VR application(s) may be configured or may be configurable (e.g., configured or configurable by the VR application developer, or by the user of the computing system prior to engaging in the VR environment). For example, the user may select (or subscribe to) one or more (of a plurality of) non-VR applications for which event status should be indicated in the VR environment (e.g., allowing a user or game developer to request or subscribe to receive event/status information for the selected non-VR applications). Thus, a user may select (or subscribe to) one or more non-VR applications selection of a non-textual indication to be provided for a non-VR application, to cause information/status to be provided or displayed to indicate a status of the selected non-VR application. Hence, the user may set preference(s) of how the one or more non-VR applications should be displayed in the VR environment. Therefore, according to an example implementation, a technique may include generating, by a virtual reality application, a virtual environment, receiving, by the virtual reality application from a non-virtual reality application, a non-virtual reality event notification, and providing, in the virtual environment by the virtual reality application based on the non-virtual reality event notification, a non-textual indication of a status of the non-virtual reality application, wherein a characteristic of the non-textual indication (e.g., a number or size of virtual object(s) that are displayed in the virtual environment, a brightness or color of a virtual object(s) that is displayed in the virtual environment, a volume of a sound that is played or output in the virtual environment, or other characteristic of a non-textual indication that may be varied or adjusted) may be adjusted to indicate a status of the non-virtual reality application (e.g., to indicate: a number of emails, a number of text messages, a number of social media messages, an upcoming calendar event, a health status/change of health status of the user, . . . ).

FIG. 1A is a diagram illustrating a computing system according to an example implementation. Computing system 10 may include any type of computing system, such as a computer, laptop, mobile device, smart phone, tablet, or a virtual reality system (e.g., which may include a HMD), and may typically include a processor, memory, a display or display device, and software or programs (or applications). In one illustrative example, computing system 10 may include a first electronic device 300 in communication with a second electronic device 302 (see FIG. 3). According to an example implementation, the computing system 10 may include a virtual reality application (VR application) 12 for generating and providing (e.g., displaying) an immersive 3D augmented and/or virtual reality (VR) environment or VR world. In an example implementation, one or more non-VR applications 18 may be running on the computing system 10. As described in greater detail herein, VR application 12 may also provide (e.g., display) a non-textual indication(s) (e.g., which may include one or more virtual objects) of a status of a non-VR application based on a non-VR event notification.

Computing system 10 may include a VR application 12 for generating a VR environment 17, a display 16 (e.g., which may be a display as part of a HMD of VR system, for example) for displaying the VR environment 17, and one or more non-VR applications 18. VR application 12 may generate a VR environment 17 for a VR activity or game that may have a specific theme, such as a beach volleyball game in which the user is a player of a volleyball game on a beach, a combat game in which the user attempts to eliminate or defend against one or more attacking bad guys, an artist game or activity in which the user draws pictures, or other VR game or activity. According to an illustrative example shown in FIG. 1A, as part of the VR environment 17 generated and displayed by VR application 12, e.g., as part of a beach volleyball game, a beach scene is displayed on display 16 that may include, for example, a beach 9 and the ocean 11. Other items and features, not shown in FIG. 1A, may also typically be provided or displayed on display 16 as part of an example (e.g., beach volleyball) VR environment 17, such as other beach volleyball players, a volleyball net, a ball, etc.

As noted, the computing system 10 may include one or more non-VR applications 18, which may be any application that is not a VR application (e.g., an application not involved in processing, generating or presenting VR data). Rather, a non-VR application may perform one or more functions or tasks that are not VR related.

In some implementations, the non-VR application 18 may include an email application 18A to send and receive emails.

In some implementations, the non-VR application 18 may include a text messaging application 18B to send and receive text messages. For example, the text message messaging application 18B may be associated with a mobile device.

In some implementations, the non-VR application 18 may include a social media application 18C to send and receive or post social media messages to a social media site or web page.

In some implementations, the non-VR application 18 may include a calendar application 18D that may be used by the user to keep track of various meeting or appointment dates and times. For example, the calendar application 18D may be a calendar associated with an email system or an external calendar software In some implementations, the non-VR application 18 may include an e-health application 18E that may (e.g., via a monitoring device near or in contact with a user) monitor and report a user's health status, such as a heart rate, blood pressure, blood sugar, or other health status (or change in health status) of the user. In other words, the e-health application 18E may measure the user's physiological traits. For example, the user's physiological traits may be associated with heart rate, breathing, blood pressure, blood sugar or other health status of the user while immersed in the VR environment 17.

In some implementations, two or more of the non-VR applications 18 may be simultaneously processed and displayed by the VR application 12. For example, the non-VR applications 18 may simultaneously process the email application 18A and the e-health application 18E and display a status of the non-VR applications.

Although a user may be immersed in the VR environment (e.g., playing a VR game or activity), the user may wish to be notified of a status or change in status of one or more non-VR applications 18, such as to be notified of, e.g., a receipt or arrival of one or more emails (or a total number of pending emails) by email application 18A, a receipt of one or more text messages (or a total number of pending text messages) by text messaging application 18B, a receipt or posting of a social media message or post by social media application 18C, an indication of an upcoming calendar event (e.g., an upcoming meeting or appointment), a health status (or a change in health status) of the user (e.g., such as a heart rate or a heart rate that exceeds a threshold, a blood sugar or a blood sugar that drops below a threshold, . . . ) or other non-VR application status, e.g., without breaking or disrupting the immersion of the VR activity for the user.

According to an illustrative example implementation, a textual indication of a status of the non-VR application may be generated and displayed, e.g., a pop-up window that includes or displays a number that indicates a number of events or pending total events for a non-VR application, such as a small pop-up window that includes a number "4" to indicate that their email application has received four emails (or that there are four total pending emails in the email application). Although, in some cases, displaying a textual indication of a status of a non-VR application in the VR environment may interrupt or disrupt the immersive VR experience that the user may be enjoying.

Therefore, according to another example implementation, a non-textual indication may be displayed to provide a status of a non-VR application. According to an example implementation, the non-textual indication (e.g., including one or more virtual objects or virtual graphical objects) may have an advantage, e.g., as compared to a textual indication, as the non-text indication, at least in some cases, as a non-textual indication (e.g., including one or more virtual objects or virtual graphical objects) may be less likely to disrupt or interrupt the immersive VR experience provided to the user. For example, displaying a pop-up window with the number 4 (e.g., to indicate a number of emails and/or messages for a non-VR application(s)) may be unusual or inconsistent with the VR environment 17, and/or may interrupt or disrupt the VR environment presented or provided to the user for a beach volleyball game (for example). Therefore, a non-textual indication (e.g., including one or more virtual objects or virtual graphical objects) may be provided or displayed in the VR environment 17 to indicate a status of a non-VR application.

As shown in FIG. 1A, a non-textual indication, which may include one or more virtual objects (or virtual graphical objects) may be provided or displayed to indicate a status of a non-VR application 18. For example, virtual cloud objects 22, including clouds 22A and 22B may be displayed on display 16, virtual bird objects 24, including birds 24A, 24B, 24C and 24D, may be displayed on display 16, and/or a virtual sun object 26 may be displayed on display 16.

According to an example implementation, a characteristic of the non-textual indication (e.g., a number or size or location of virtual object(s) that are displayed in the virtual environment, a brightness or color of a virtual object(s) that is displayed in the virtual environment, a volume of a sound that is played or output in the virtual environment, or other characteristic of a non-textual indication that may be varied or adjusted) may be adjusted to indicate a status of the non-virtual reality application.

For example, within the VR environment 17, a number or quantity of virtual objects may be varied to indicate the status of a non-VR application. For example, a number of birds 24 may be displayed that matches the number of received emails or the number of total pending emails for email application 18A (where a number of the virtual objects may be adjusted to indicate a number of events or messages for a non-VR application 18). In some implementations alternatively, a bird may be displayed for every X (where, e.g., X may be 1, 2, 5, 10, . . . or other number) number of events (e.g., messages, emails, . . . ), that have been received (or which are pending) by non-VR application 18, for example. In some implementations, as another example, one cloud 22 may be displayed for every 5 social media application posts that have been received or detected by the social medial application 18C. In some implementations, alternatively, the number of virtual objects may be varied or adjusted to indicate when an upcoming meeting will be starting, e.g., for example, where 10 birds 24 are displayed when meeting will be starting in 10 minutes, 8 birds are displayed when the meeting will be starting in 8 minutes, . . . 2 birds will be displayed when the upcoming meeting/calendar event on calendar application 18D will be starting in 2 minutes, and 1 bird will be displayed (e.g., to indicate: a number of emails, a number of text messages, a number of social media messages, an upcoming calendar event, a health status/change of health status of the user, . . . ). In some implementations, for a sports VR program (e.g., basketball or football game), the number of people in the stands may decrease as the time becomes nearer to the scheduled start time for an upcoming meeting or appointment for calendar application 18D, e.g., fans in the stands begin leaving as the game is ending and time for the user's upcoming appointment is drawing near. In some implementations, a number of virtual objects displayed in the VR environment 17 may be adjusted to indicate a health status of the user, e.g., heartbeat, blood pressure, blood sugar, . . . . For example, 4 birds (displayed within VR environment 17) may represent a normal or good blood sugar level; 3 birds may represent or indicate slightly low blood sugar level; 2 birds may represent or indicate a low blood sugar level; and 1 bird may indicate a very low blood sugar level of the user. Similarly, the number of virtual objects displayed in VR environment 17 may be varied or adjusted to indicate a different status (e.g., different blood pressure, different heart rate, different number of messages and emails received, etc.) of the non-VR application.

A size of the virtual object(s) displayed may be varied as well to indicate a status of a non-VR application. For example, the size of a cloud 22 may be adjusted or varied to indicate a different status of the non-VR application 18. For example, a very small cloud may indicate that only 1 email has been received or is pending by email application; a small (but slightly larger) cloud may indicate that 2-4 emails have been received; and a medium (and slightly larger) size cloud may indicate that 5-7 emails have been received or are pending, etc. After the cloud 22 passes across the virtual environment 17 on display 16, e.g., from left to right, a new cloud may later appear on the display 16 to indicate that additional emails have been received, or to indicate a total number of pending emails in the email application 18A, for example.

A position of a virtual object may be varied within the display or the VR environment 17 to indicate a status of a non-VR application. For example, sun 26 may drop lower and lower in the sky, to indicate a setting sun, as time becomes closer to an upcoming scheduled meeting or appointment within calendar application, or the position of the sun 26 may vary or be adjusted to indicate a health status of the user (e.g., sun rises up in the sky as blood pressure increases, and lowers in the sky as blood pressure lowers).

Also, other characteristics may be varied to indicate a status of a non-VR application. For example, a volume of a sound may be adjusted, or a brightness or color of a virtual object may be adjusted or may change to indicate a status or change in status of a non-VR application. For example, a periodic sound that is played may increase as more events occur in the non-VR application. In some implementations, the color of sun 26 may change to indicate a change in health status, e.g., sun 26 being yellow to indicate normal heart rate, orange for medium heart rate, and turns to red to indicate a high heart rate which may be dangerous for the user.

According to an example implementation, the non-textual indication displayed within VR environment 17 may indicate a status of multiple (or a plurality of) non-VR applications. For example, different types of virtual objects may be used to indicate status of different non-VR applications, e.g., with one type of virtual object displayed per non-VR application. For example, birds 24 (e.g., a number of birds or a size of the birds) may be used to indicate a status of email application 18A; clouds 22 (e.g., a number or size of the clouds) may be used to indicate a status of a social media application 18C; sun 26 (position or color of the sun) may be used to indicate a status of an e-health application 18E; and a number of people of fans in the stands may be used to indicate a status of calendar application 18D (e.g., displaying fewer people in the stands or bleachers as the current time becomes nearer to a scheduled start time for an upcoming meeting).

In another example implementation, different characteristics of a same (or same type of) virtual object may be used to indicate a status of different non-VR applications. For example, a number of birds 24 displayed in the VR environment 17 may indicate a number of emails, whereas a size of the birds 24 may indicate a number of social media posts/messages, etc. Similarly, the size, location and color of sun 26 may be used to indicate a status of three different non-VR applications 18.

Also, according to an illustrative example implementation, the computing system 10 (e.g., including display 16) may provide or display one or more virtual objects (e.g., virtual graphical objects) that are consistent with a theme of the VR application/VR environment 17 or may be integrated with the VR environment 17. For example, with respect to a beach volleyball game provided by VR application 12, a number of outdoor-related virtual objects associated with (or consistent with or integrated with a theme of) a beach environment or a beach volleyball game, e.g., one or more virtual objects that might commonly be seen or experienced at such VR environment having that VR theme. For example, for an outdoor theme, such as a beach volleyball game, one or more virtual objects may be displayed that might typically be expected in such an environment, such as clouds, birds that are flying, planes flying overhead, crabs crawling on the beach, a sun setting, etc., to provide or indicate a status of a non-VR application(s). Thus, at least in some illustrative example implementations, one or more of the displayed or provided (graphical or non-textual) virtual objects, which may be used to indicate a status of a non-VR application, may be consistent with a theme of or integrated with the VR environment or a VR application, which may mean or may include, for example, that the virtual objects provided or displayed in the virtual environment 17 are not inconsistent with the virtual environment or a VR application. For example, a pop-up window inserted into a beach volleyball game or a combat game may be considered, at least for some VR games, to be inconsistent with those games (e.g., not common, or typically not part of the VR environment for that VR game). For example, an indoor VR game that takes place inside a building may not typically provide or display objects that are typically found outdoors, such as a sun, clouds (although in some cases animals may be found inside a building). In some implementations, as another example, it may be considered unusual (and thus not consistent with a beach volleyball game theme) to see a tank driving on the beach during a beach volleyball game. Thus, according to an example implementation, at least one virtual object may be provided or displayed that is consistent with (or not inconsistent with) a theme of a VR application/VR environment, such as clouds or birds or sand crabs, or a setting sun, for the beach volleyball game, a number of fans/people in the stands of a stadium of sporting event, etc.

According to an example implementation, the display of non-textual indication(s) to indicate a status of a non-VR application(s) may be configured or may be configurable (e.g., configured or configurable by the VR application developer, or by the user of the computing system 10. In some implementations, a menu or graphical user interface (GUI) may be presented or displayed that allows a selection of one or more (of a plurality of) non-VR applications for which event status should be indicated in the VR environment (e.g., allowing a user or game developer to request or subscribe to receive event/status information for the selected non-VR applications). For example, a user may select (or subscribe to) an email application 18A, and e-health application 18Ea selection of a non-textual indication to be provided for a non-VR application, to cause information/status to be provided or displayed to indicate a status of the selected non-VR application.

In some implementations, the menu or graphical user interface (GUI) may be presented or displayed that allows a selection of one of a plurality of virtual object types to be used to indicate a status for each of the selected non-VR application. For example, the birds 24 may be selected to indicate a status of the email application 18A, and the sun 26 may be selected to indicate a status of e-health application 18E.

In some implementations, the menu or graphical user interface (GUI) may be presented or displayed that allows, for example, a selection of a characteristic of the selected virtual object type to be varied to indicate a status of each of the selected non-VR applications 18. For example, a size of the birds 24 may be selected for the email application, and a location (or a color) of the sun 26 may be selected to indicate a status of the e-health application. Also, one of a plurality of scales (e.g., indicating a quantity of virtual objects per quantity of non-VR application events) may be selected, e.g., where 1 bird indicates or corresponds to 3 received emails, and specific heart rate thresholds are selected or specified for sun colors of yellow, orange and red, for example.

According to an example implementation, with reference to FIG. 1A, a non-VR event interface 14 may communicate with each of one or more non-VR applications 18, and may receive indications of events that have occurred or a status update with respect to one or more of the non-VR applications 18. In addition, the non-VR event interface 14, may include or may be an application programming interface. The non-VR event interface 14, that may indicate, for example, an event notification and may include, for example, one or more of: 1) an application identifier module 14A, 2) an event identifier module 14B, and 3) a quantity of the events module 14C (e.g., 3 emails received, or heart rate is now X).

In some implementations, the application identifier module 14A may be configured to identify the non-VR application(s) specifically being used. For example, if an email is received, the application identifier module 14A may be configured to identify the email application 18A in the non-VR application 18 to indicate that email is received. In another example, if a user's health status (e.g., heart rate, blood pressure, blood sugar, or other health status) is monitored, the application identifier module 14A may be configured to identify the e-health application 18E in the non-VR application 18 to indicate the health status of the user. Other non-VR applications 18 may be used instead of, or in addition to the ones described herein.

In some implementations, the event identifier module 14B may be configured to identify the event that occurred in the non-VR application. Using the examples of above, if an email is received, the event identifier module 14B may be configured to identify the email received and display a non-textual indication in the VR environment. In another example, if the user's heart rate change, the event identifier 14B may identify the current status of the user's heart rate and report the status in a non-textual indication in the VR environment. Other non-VR applications 18 may be used instead of, or in addition to the ones described herein.

In some implementations, the quantity of the events module 14C may be configured to identify the quantity (e.g., number) of events received in the non-VR application. Using again the examples of above, if 3 emails are received, the quantity of the events module 14C may be configured to identify the quantity of emails received and display a non-textual indication (e.g., 3 birds) in the VR environment indicating the quantity of events. In another example, if the user's heart rate change, the quantity of the events module 14C may be configured to identify the current status of the user's heart rate and report the status in a non-textual indication (e.g., 3 birds may indicate high blood pressure and 1 bird may indicate low blood pressure) in the VR environment. Other non-VR applications 18 may be used instead of, or in addition to the ones described herein.

The VR application 12 may receive the event notification from the non-VR event interface 14, e.g., which may include one or more of the application identifier module 14A, the event identifier module 14B, and the quantity of the events module 14C. The VR application 12 (or the computing system 10), e.g., based on the configuration information received (that selected a type of objects and characteristic to be displayed for each selected non-VR application), may then display the selected virtual object type, with the selected characteristic (e.g., having the size, quantity, color, location, . . . as selected) in accordance with the reported event notification (e.g., based on the quantity of emails indicated, or the heart rate indicated) received from the non-VR event interface 14.

Figure 1B:
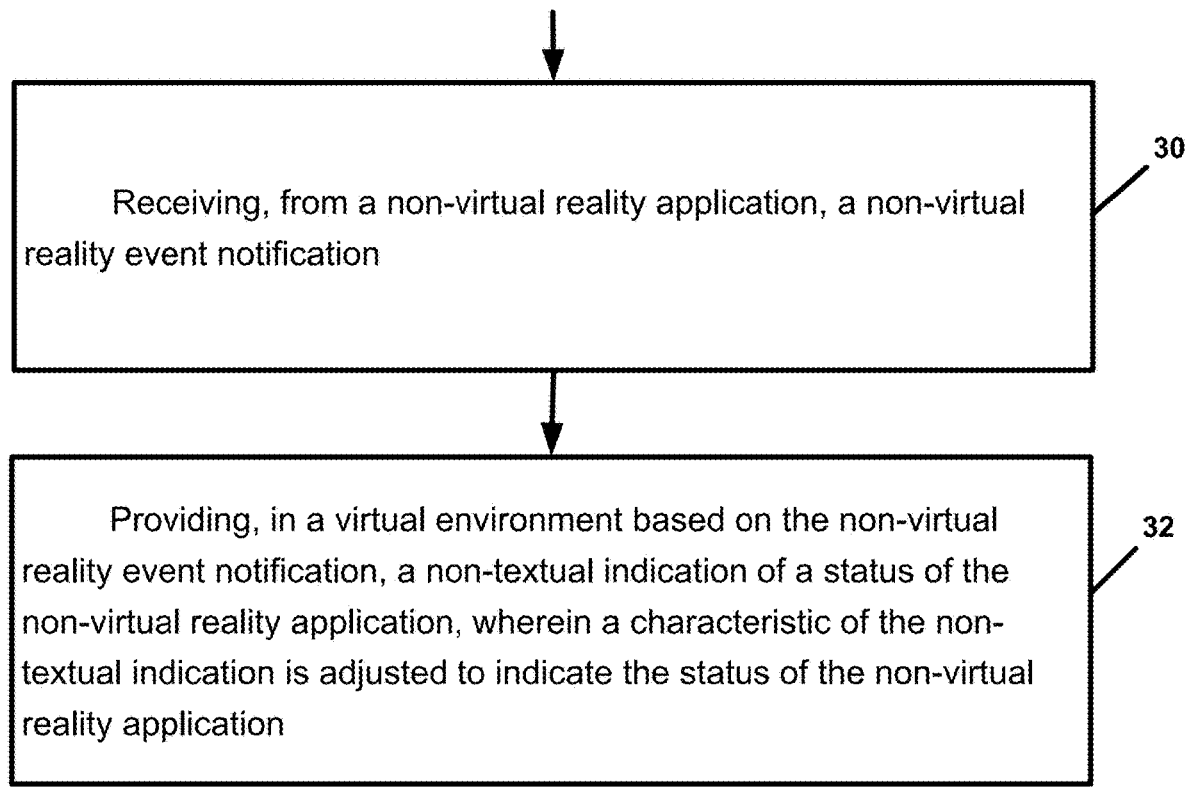
FIG. 1B is a flow chart illustrating operation of a computing system according to an example implementation.

FIG. 1B is a flow chart illustrating operation of a computing system according to an example implementation. Referring to FIG. 1B, operation 30 includes receiving, from a non-virtual reality application, a non-virtual reality event notification. Operation 32 includes providing, in a virtual environment based on the non-virtual reality event notification, a non-textual indication of a status of the non-virtual reality application, wherein a characteristic of the non-textual indication is adjusted to indicate the status of the non-virtual reality application.

According to an example implementation of the method of FIG. 1B, the receiving may include receiving, from a non-virtual reality application, a non-virtual reality event notification that includes receiving at least one of the following: an indication of a receipt of one or more emails by an email application; an indication of a receipt of one or more text messages by a text messaging application; an indication of a receipt of one or more messages by a social media or messaging application, an indication of an upcoming calendar event, and status of user's health, such as a heart rate, blood pressure, blood sugar, or other health status (or change in health status).

According to an example implementation of the method of FIG. 1B, the characteristic of the non-textual indication that is adjusted to indicate the status of the non-virtual reality application may include at least one of the following: a quantity of a type of virtual object displayed in the virtual environments is adjusted to indicate a number of non-virtual reality events for the non-virtual reality application; a size of a type of virtual object displayed in the virtual environments is adjusted to indicate a number of non-virtual reality events for the non-virtual reality application; a volume of a sound output in the virtual environment environments is adjusted to indicate a number of non-virtual reality events for the non-virtual reality application; a brightness of a portion of a display screen to display the virtual environment is adjusted to indicate a number of non-virtual reality events for the non-virtual reality application; a volume of a sound output in the virtual environment environments is adjusted to indicate a timing of a non-virtual reality event for the non-virtual reality application; and a brightness of a portion of a display screen to display the virtual environment is adjusted to indicate a timing of a non-virtual reality event for the non-virtual reality application.

According to an example implementation of the method of FIG. 1B, the characteristic of the non-textual indication that is adjusted to indicate the status of the non-virtual reality application includes at least one of the following: a quantity of a type of virtual object displayed in the virtual environments is adjusted to indicate a number of new non-virtual reality events that have been received by the non-virtual reality application; and, a quantity of a type of virtual object displayed in the virtual environment is adjusted to indicate a total number of pending non-virtual reality events for the non-virtual reality application.

According to an example implementation of the method of FIG. 1B, the characteristic of the non-textual indication that is adjusted to indicate the status of the non-virtual reality application includes: a first quantity of a first type of virtual objects displayed in the virtual environments is adjusted to indicate a first number of non-virtual reality events for a first non-virtual reality application; and a second quantity of a second type of virtual objects displayed in the virtual environments is adjusted to indicate a second number of non-virtual reality events for a second non-virtual reality application.

According to an example implementation of the method of FIG. 1B, the characteristic of the non-textual indication that is adjusted to indicate the status of the non-virtual reality application includes: a first characteristic of a type of virtual objects displayed in the virtual environments is adjusted to indicate a first number of non-virtual reality events for a first non-virtual reality application; and a second characteristic of the type of virtual objects displayed in the virtual environments is adjusted to indicate a second number of non-virtual reality events for a second non-virtual reality application.

According to an example implementation of the method of FIG. 1B, the providing may include: displaying, in the virtual environment by the virtual reality application, a number of virtual objects, where the number of the displayed virtual objects indicates or is based upon a number of non-virtual reality events, wherein the displayed virtual objects are consistent with a theme of the virtual environment generated by the virtual reality application.

According to an example implementation of the method of FIG. 1B, and further including receiving a selection of the non-textual indication to be provided in the virtual environment by the virtual reality application.

According to an example implementation of the method of FIG. 1B, the receiving a selection of an indication includes: receiving a selection of a type of virtual object to be displayed as the non-textual indication.

According to an example implementation of the method of FIG. 1B, and further including receiving an indication of the characteristic of the non-textual indication to be adjusted to indicate the status of the non-virtual reality application.

According to an example implementation of the method of FIG. 1B, the event notification may include: an application identifier to identify the non-virtual reality application and an event identifier to identify the non-virtual reality event.

According to an example implementation of the method of FIG. 1B, the event notification further includes: an indication of a quantity of the non-virtual reality events. Also, a quantity of virtual objects to be displayed for the non textual indication may be adjusted to indicate a number of non-virtual reality events.

According to an example implementation of the method of FIG. 1B, the non-textual indication may be consistent with a theme of the virtual environment generated by the virtual reality application.

Figure 1C:
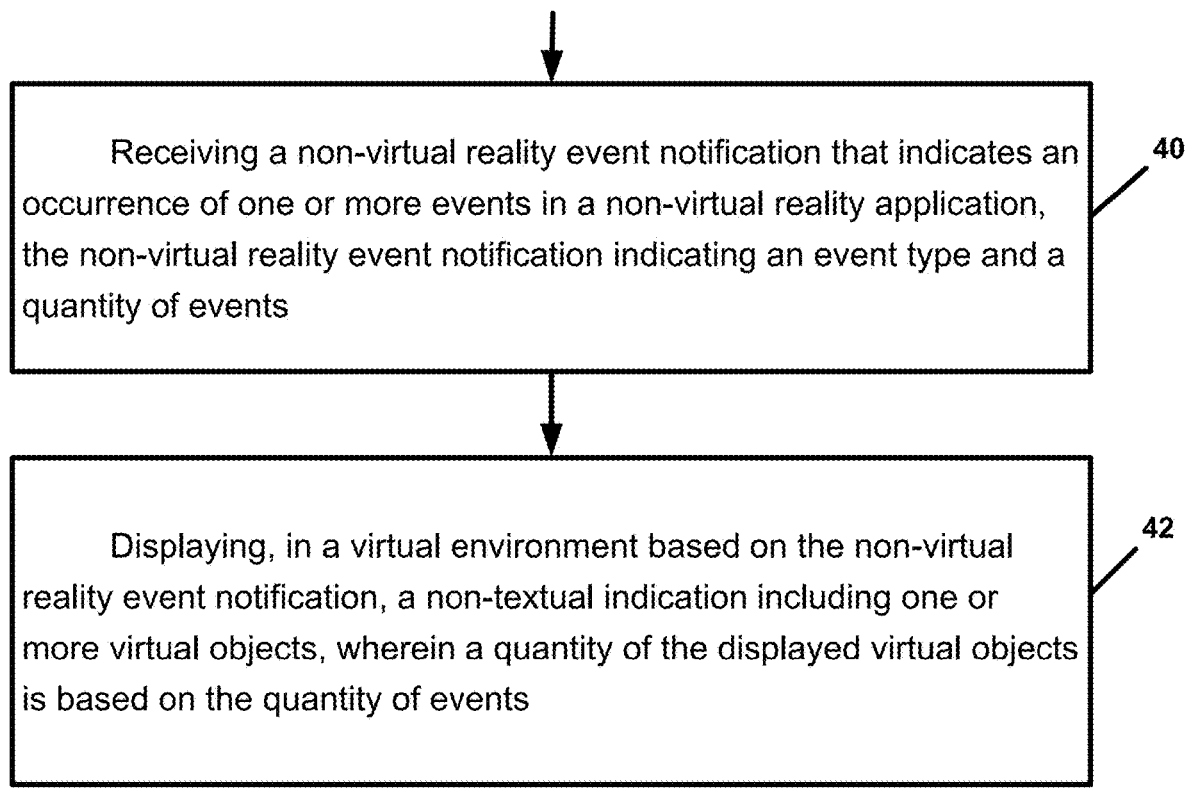
FIG. 1C is a flow chart illustrating operation of a computing system according to another example implementation.

FIG. 1C is a flow chart illustrating operation of a computing system according to another example implementation. Referring to FIG. 1C, operation 40 includes receiving a non-virtual reality event notification that indicates an occurrence of one or more events in a non-virtual reality application, the non-virtual reality event notification indicating an event type and a quantity of events. Operation 42 includes displaying, in a virtual environment based on the non-virtual reality event notification, a non-textual indication including one or more virtual objects, wherein a quantity of the displayed virtual objects is based on the quantity of events.

According to an example implementation of the method of FIG. 1C, the receiving may include: receiving a first non-virtual reality event notification that indicates an occurrence of one or more events in a non-virtual reality application, the non-virtual reality event notification indicating a first quantity of events of an event type; receiving a second non-virtual reality event notification that indicates an occurrence of one or more events in the non-virtual reality application, the second non-virtual reality event notification indicating a second quantity of events of the event type, the second quantity of events being different from the first quantity of events.

According to an example implementation of the method of FIG. 1C, the displaying may include: displaying, in the virtual environment based on the first non-virtual reality event notification, a first non-textual indication including a first quantity of virtual objects, wherein the first quantity of the displayed virtual objects is based on the first quantity of events; displaying, in the virtual environment based on the second non-virtual reality event notification, a second non-textual indication, including a second quantity of virtual objects that is different from the first quantity of the virtual objects, wherein the second quantity of the displayed virtual objects is based on the second quantity of events.

According to an example implementation of the method of FIG. 1C, the receiving may include: receiving a first non-virtual reality event notification that indicates an occurrence of one or more events in a first non-virtual reality application, the first non-virtual reality event notification indicating a first event type and a first quantity of events; receiving a second non-virtual reality event notification that indicates an occurrence of one or more events in a second non-virtual reality application, the second non-virtual reality event notification indicating a second event type and a second quantity of events.

According to an example implementation of the method of FIG. 1C, the displaying may include: displaying, in the virtual environment based on the first non-virtual reality event notification, a first non-textual indication including a first quantity of a first type of virtual objects, wherein the first quantity of the first type of virtual objects is based on the first quantity of events of the first event type; displaying, in the virtual environment based on the second non-virtual reality event notification, a second non-textual indication including a second quantity of a second type of virtual objects, wherein the second quantity of the second type of virtual objects is based on the second quantity of events of the second event type.

According to an example implementation of the method of FIG. 1C, the receiving may include: receiving, by a virtual reality application, a non-virtual reality event notification that includes receiving at least one of the following: an indication of a receipt of one or more emails by an email application; an indication of a receipt of one or more text messages by a text messaging application; an indication of a receipt of one or more messages by a social media or messaging application; an indication of an upcoming calendar event.

Figure 1D:
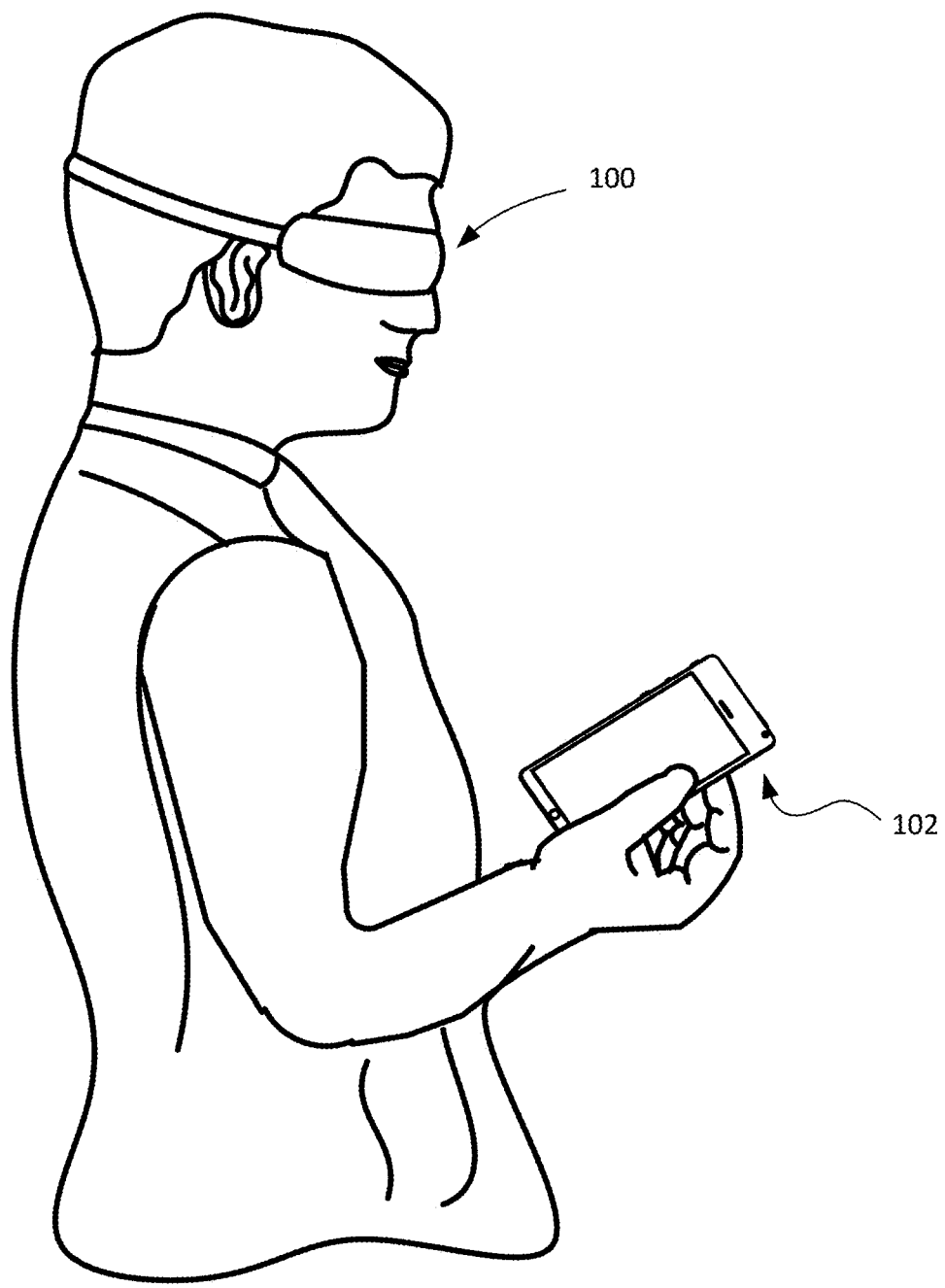
FIG. 1D is an example implementation of a virtual reality system including a head mounted display and a handheld electronic device, in accordance with implementations described herein.

In the example implementation shown in FIG. 1D, a user wearing an HMD 100 is holding a portable handheld electronic device 102. The handheld electronic device 102 may be, for example, a smartphone, a controller, a gyromouse, a joystick, or another portable handheld electronic device(s) that may be paired with, and communicate with, the HMD 100 for interaction in the immersive virtual environment generated by the HMD 100. The handheld electronic device 102 may be operably coupled with, or paired with the HMD 100 via, for example, a wired connection, or a wireless connection such as, for example, a WiFi or Bluetooth connection. This pairing, or operable coupling, of the handheld electronic device 102 and the HMD 100 may provide for communication and exchange of data between the handheld electronic device 102 and the HMD 100, and may allow the handheld electronic device 102 to function as a controller for interacting in the immersive virtual environment generated by the HMD 100. That is, a manipulation of the handheld electronic device 102, such as, for example, to generate a virtual beam or ray emitted by the handheld electronic device 102 directed to a virtual object or feature for selection, and/or an input received on a touch surface of the handheld electronic device 102, and/or a movement of the handheld electronic device 102, may be translated into a corresponding selection, or movement, or other type of interaction, in the immersive virtual environment generated by the HMD 100. For example, the HMD 100, together with the handheld electronic device 102, may generate a virtual environment as described above, and the handheld electronic device 102 may be manipulated to effect a change in scale, or perspective, of the user relative to the virtual features in the virtual environment as described above.

FIGS. 2A and 2B are perspective views of an example HMD, such as, for example, the HMD 100 worn by the user in FIG. 1D, and FIG. 2C illustrates an example handheld electronic device, such as, for example, the handheld electronic device 102 shown in FIG. 1.

The handheld electronic device 102 may include a housing 103 in which internal components of the device 102 are received, and a user interface 104 on an outside of the housing 103, accessible to the user. The user interface 104 may include a touch sensitive surface 106 configured to receive user touch inputs. The user interface 104 may also include other components for manipulation by the user such as, for example, actuation buttons, knobs, joysticks and the like. In some implementations, at least a portion of the user interface 104 may be configured as a touchscreen, with that portion of the user interface 104 being configured to display user interface items to the user, and also to receive touch inputs from the user on the touch sensitive surface 106. The handheld electronic device 102 may also include a light source 108 configured to selectively emit light, through a port in the housing 103, and other manipulation devices 105 manipulatable by the user.

The HMD 100 may include a housing 110 coupled to a frame 120, with an audio output device 130 including, for example, speakers mounted in headphones, also be coupled to the frame 120. In FIG. 2B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. In some implementations, the HMD 100 may include a sensing system 160 including various sensors and a control system 170 including a processor 190 and various control system devices to facilitate operation of the HMD 100.

In some implementations, the HMD 100 may include a camera 180 to capture still and moving images. The images captured by the camera 180 may be used to help track a physical position of the user and/or the handheld electronic device 102 in the real world, and/or may be displayed to the user on the display 140 in a pass through mode, allowing the user to temporarily leave the virtual environment and return to the physical environment without removing the HMD 100 or otherwise changing the configuration of the HMD 100 to move the housing 110 out of the line of sight of the user.

In some implementations, the HMD 100 may include a gaze tracking device 165 to detect and track an eye gaze of the user. The gaze tracking device 165 may include, for example, an image sensor 165A, or multiple image sensors 165A, to capture images of the user's eyes, for example, a particular portion of the user's eyes, such as, for example, the pupil, to detect, and track direction and movement of, the user's gaze. In some implementations, the HMD 100 may be configured so that the detected gaze is processed as a user input to be translated into a corresponding interaction in the immersive virtual experience.

Figure 3:
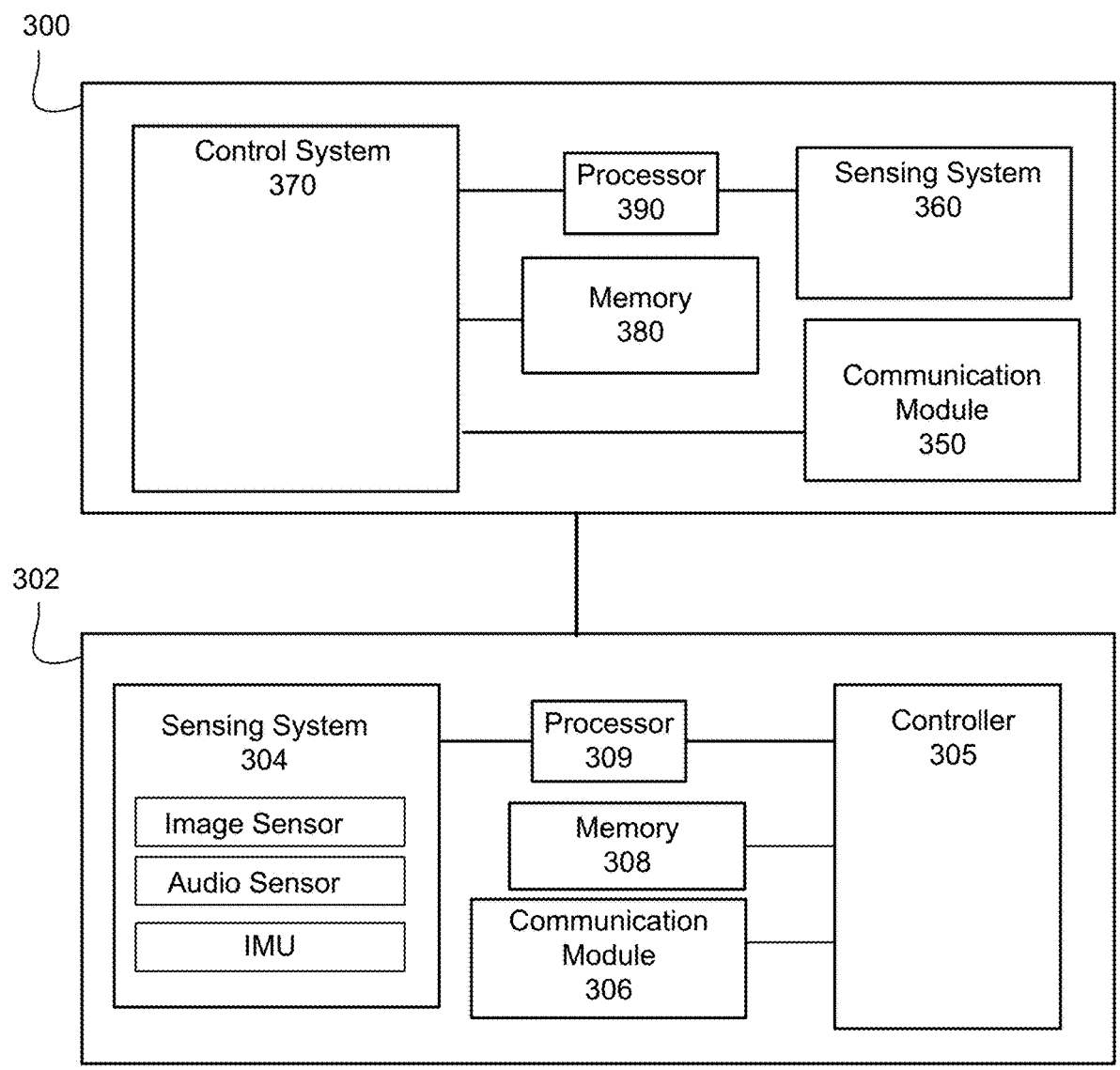
FIG. 3 is a block diagram of a head mounted electronic device and a handheld electronic device, in accordance with embodiments as described herein.

A block diagram of a system providing for teleportation and scaling in an augmented and/or virtual reality environment is shown in FIG. 3. The system may include a first electronic device 300 in communication with a second electronic device 302. The first electronic device 300 may be, for example an HMD as described above with respect to FIGS. 1, 2A and 2B, generating an immersive virtual environment, and the second electronic device 302 may be, for example, a handheld electronic device as described above with respect to FIGS. 1 and 2C, that is in communication with the first electronic device 300 to facilitate user interaction with the immersive virtual environment generated by the first electronic device 300.

The first electronic device 300 may include a sensing system 360 and a control system 370, which may be similar to the sensing system 160 and the control system 170, respectively, shown in FIGS. 2A and 2B. The sensing system 360 may include one or more different types of sensors, including, for example, a light sensor, an audio sensor, an image sensor, a distance/proximity sensor, and/or other sensors and/or different combination(s) of sensors, including, for example, an image sensor positioned to detect and track the user's eye gaze, such as the gaze tracking device 165 shown in FIG. 2B. The control system 370 may include, for example, a power/pause control device, audio and video control devices, an optical control device, a transition control device, and/or other such devices and/or different combination(s) of devices. The sensing system 360 and/or the control system 370 may include more, or fewer, devices, depending on a particular implementation. The elements included in the sensing system 360 and/or the control system 370 may have a different physical arrangement (e.g., different physical location) within, for example, an HMD other than the HMD 100 shown in FIGS. 2A and 2B. The first electronic device 300 may also include a processor 390 in communication with the sensing system 360 and the control system 370, a memory 380, and a communication module 350 providing for communication between the first electronic device 300 and another, external device, such as, for example, the second electronic device 302.

The second electronic device 302 may include a communication module 306 providing for communication between the second electronic device 302 and another, external device, such as, for example, the first electronic device 300. In addition to providing for the exchange of data between the first electronic device 300 and the second electronic device 302, the communication module 306 may also be configured to emit a ray or beam as described above to communicate an electronic signal. The second electronic device 302 may include a sensing system 304 including an image sensor and an audio sensor, such as is included in, for example, a camera and microphone, an inertial measurement unit including, for example an accelerometer and/or a gyroscope and/or a magnetometer, a touch sensor such as is included in a touch sensitive surface of a handheld electronic device, or smartphone, and other such sensors and/or different combination(s) of sensors. A processor 309 may be in communication with the sensing system 304 and a controller 305 of the second electronic device 302, the controller 305 having access to a memory 308 and controlling overall operation of the second electronic device 302.

As noted above, a controller, such as, for example, the handheld electronic device 102 described above, may be manipulated by a user for interaction and navigation in the virtual environment. When navigating in the virtual environment, the user may direct, or point, the handheld electronic device 102 to a virtual feature to be selected, and a virtual beam may be generated by the system, based on, for example, orientation information generated by the sensors of the handheld electronic device 102, to identify the virtual feature and/or location to be selected by the user. In some implementations, the light source 108 may direct a ray or beam toward a virtual feature or item to be selected, and the ray or beam generated by the light source 108 may be detected by the system (for example, by a camera on the HMD 100) and a rendering of the detected ray or beam may be displayed to the user in the virtual environment for selection of the virtual feature.

Figure 4:
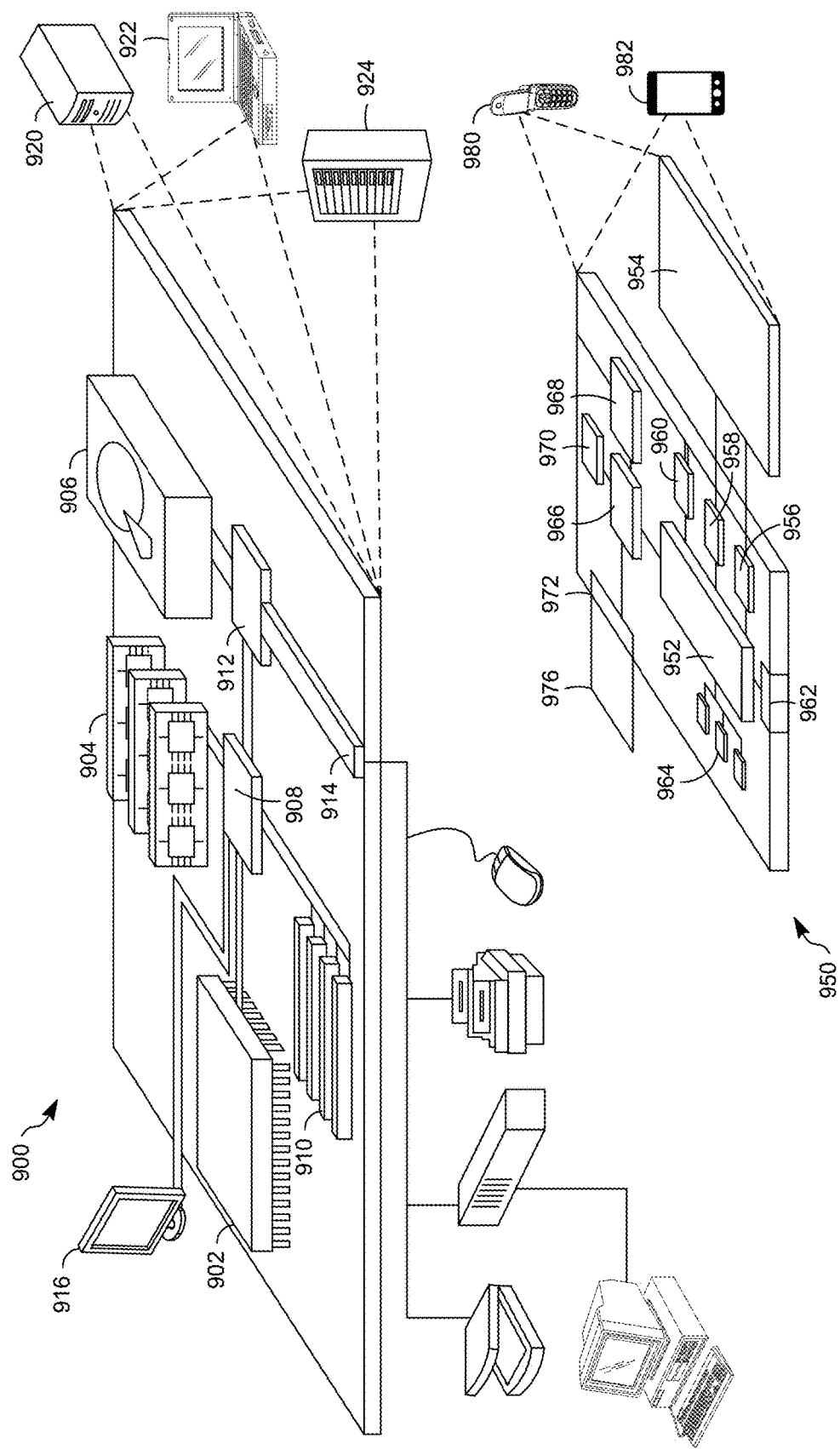
FIG. 4 shows an example of a computer device and a mobile computer device that can be used to implement the techniques described herein.

FIG. 4 shows an example of a generic computer device 900 and a generic mobile computer device 950, which may be used with the techniques described here. Computing device 900 is intended to represent various forms of digital computers, such as laptops, desktops, tablets, workstations, personal digital assistants, televisions, servers, blade servers, mainframes, and other appropriate computing devices. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. The processor 902 can be a semiconductor-based processor. The memory 904 can be a semiconductor-based memory. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Further implementations are summarized in the following examples:

Example 1

A method, comprising: receiving, from a non-virtual reality application, a non-virtual reality event notification; and providing, in a virtual environment based on the non-virtual reality event notification, a non-textual indication of a status of the non-virtual reality application, wherein a characteristic of the non-textual indication is adjusted to indicate the status of the non-virtual reality application.

Example 2

The method of claim 1, wherein receiving, from the non-virtual reality application, the non-virtual reality event notification includes at least one of the following: an indication of a receipt of one or more emails by an email application; an indication of a receipt of one or more text messages by a text messaging application; an indication of a receipt of one or more messages by a social media or messaging application; or an indication of an upcoming calendar event.

Example 3

The method of claim 1 or 2, wherein the characteristic of the non-textual indication that is adjusted to indicate the status of the non-virtual reality application includes at least one of the following: a quantity of a type of virtual object displayed in the virtual environment is adjusted to indicate a number of non-virtual reality events for the non-virtual reality application; a size of a type of virtual object displayed in the virtual environment is adjusted to indicate a number of non-virtual reality events for the non-virtual reality application; a volume of a sound output in the virtual environment is adjusted to indicate a number of non-virtual reality events for the non-virtual reality application; a brightness of a portion of a display screen to display the virtual environment is adjusted to indicate a number of non-virtual reality events for the non-virtual reality application; a volume of a sound output in the virtual environment environments is adjusted to indicate a timing of a non-virtual reality event for the non-virtual reality application; or a brightness of a portion of a display screen to display the virtual environment is adjusted to indicate a timing of a non-virtual reality event for the non-virtual reality application.

Example 4

The method of claims 1 to 3, wherein the characteristic of the non-textual indication that is adjusted to indicate the status of the non-virtual reality application includes at least one of the following: a quantity of a type of virtual object displayed in the virtual environment is adjusted to indicate a number of new non-virtual reality events that have been received by the non-virtual reality application; or a quantity of a type of virtual object displayed in the virtual environment is adjusted to indicate a total number of pending non-virtual reality events for the non-virtual reality application.

Example 5

The method of claims 1 to 4, wherein the characteristic of the non-textual indication that is adjusted to indicate the status of the non-virtual reality application includes: a first quantity of a first type of virtual objects displayed in the virtual environment is adjusted to indicate a first number of non-virtual reality events for a first non-virtual reality application; and a second quantity of a second type of virtual objects displayed in the virtual environment is adjusted to indicate a second number of non-virtual reality events for a second non-virtual reality application.

Example 6

The method of claims 1 to 5, wherein the characteristic of the non-textual indication that is adjusted to indicate the status of the non-virtual reality application includes: a first characteristic of a type of virtual objects displayed in the virtual environment is adjusted to indicate a first number of non-virtual reality events for a first non-virtual reality application; and a second characteristic of the type of virtual objects displayed in the virtual environment is adjusted to indicate a second number of non-virtual reality events for a second non-virtual reality application.

Example 7

The method of claims 1 to 6, wherein providing the non-textual indication of the status of the non-virtual reality application includes: displaying, in the virtual environment by the virtual reality application, a number of virtual objects, where the number of the displayed virtual objects indicates or is based upon a number of non-virtual reality events, wherein the displayed virtual objects are consistent with a theme of the virtual environment generated by the virtual reality application.

Example 8

The method of claims 1 to 7, further comprising receiving a selection of the non-textual indication to be provided in the virtual environment by the virtual reality application.

Example 9

The method of claim 8, wherein the receiving a selection of an indication comprises: receiving a selection of a type of virtual object to be displayed as the non-textual indication.

Example 10

The method of claim 8, further comprising receiving an indication of the characteristic of the non-textual indication to be adjusted to indicate the status of the non-virtual reality application.

Example 11

The method of claims 1 to 10, wherein a quantity of virtual objects to be displayed for the non textual indication is adjusted to indicate a number of non-virtual reality events.

Example 12

The method of claims 1 to 11, wherein the non-textual indication is consistent with a theme of the virtual environment generated by the virtual reality application.

Example 13

A system, comprising: a computing device configured to generate an immersive virtual environment, the computing device including: a memory storing executable instructions; and a processor configured to execute the instructions to cause the computing device to: receive, from a non-virtual reality application, a non-virtual reality event notification; and provide, in a virtual environment based on the non-virtual reality event notification, a non-textual indication of a status of the non-virtual reality application, wherein a characteristic of the non-textual indication is adjusted to indicate the status of the non-virtual reality application.

Example 14

A method, comprising: receiving a non-virtual reality event notification that indicates an occurrence of one or more events in a non-virtual reality application, the non-virtual reality event notification indicating an event type and a quantity of events; and displaying, in a virtual environment based on the non-virtual reality event notification, a non-textual indication including one or more virtual objects, wherein a quantity of the displayed virtual objects is based on the quantity of events.

Example 15

The method of claim 14, wherein receiving the non-virtual reality event notification that indicates an occurrence of one or more events in the non-virtual reality application includes: receiving a first non-virtual reality event notification that indicates an occurrence of one or more events in a non-virtual reality application, the non-virtual reality event notification indicating a first quantity of events of an event type; receiving a second non-virtual reality event notification that indicates an occurrence of one or more events in the non-virtual reality application, the second non-virtual reality event notification indicating a second quantity of events of the event type, the second quantity of events being different from the first quantity of events.

Example 16

The method of claim 14 or 15, wherein displaying the non-textual indication including one or more virtual objects includes: displaying, in the virtual environment based on the first non-virtual reality event notification, a first non-textual indication including a first quantity of virtual objects, wherein the first quantity of the displayed virtual objects is based on the first quantity of events; and displaying, in the virtual environment based on the second non-virtual reality event notification, a second non-textual indication, including a second quantity of virtual objects that is different from the first quantity of the virtual objects, wherein the second quantity of the displayed virtual objects is based on the second quantity of events.

Example 17

The method of claims 14 to 16, wherein receiving the non-virtual reality event notification that indicates an occurrence of one or more events in the non-virtual reality application includes: receiving a first non-virtual reality event notification that indicates an occurrence of one or more events in a first non-virtual reality application, the first non-virtual reality event notification indicating a first event type and a first quantity of events; and receiving a second non-virtual reality event notification that indicates an occurrence of one or more events in a second non-virtual reality application, the second non-virtual reality event notification indicating a second event type and a second quantity of events.

Example 18

The method of claims 14 to 17, wherein displaying the non-textual indication including one or more virtual objects includes: displaying, in the virtual environment based on the first non-virtual reality event notification, a first non-textual indication including a first quantity of a first type of virtual objects, wherein the first quantity of the first type of virtual objects is based on the first quantity of events of the first event type; and displaying, in the virtual environment based on the second non-virtual reality event notification, a second non-textual indication including a second quantity of a second type of virtual objects, wherein the second quantity of the second type of virtual objects is based on the second quantity of events of the second event type.

Example 19

The method of claims 14 to 18, wherein receiving the non-virtual reality event notification that indicates an occurrence of one or more events in the non-virtual reality application includes at least one of the following: an indication of a receipt of one or more emails by an email application; an indication of a receipt of one or more text messages by a text messaging application; an indication of a receipt of one or more messages by a social media or messaging application; or an indication of an upcoming calendar event.

Example 20

A system, comprising: a computing device configured to generate an immersive virtual environment, the computing device including: a memory storing executable instructions; and a processor configured to execute the instructions to cause the computing device to: receive a non-virtual reality event notification that indicates an occurrence of one or more events in a non-virtual reality application, the non-virtual reality event notification indicating an event type and a quantity of events; and display, in a virtual environment based on the non-virtual reality event notification, a non-textual indication including one or more virtual objects, wherein a quantity of the displayed virtual objects is based on the quantity of events.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
receiving, from a plurality of non-virtual reality applications, a first non-virtual reality event notification and a second non-virtual reality event notification, the second non-virtual reality event notification being a different type than the first non-virtual reality event notification, the first non-virtual reality event notification being associated with a first non-virtual reality application from the plurality of non-virtual reality applications and the second non-virtual reality event notification being associated with a second non-virtual reality application from the plurality of non-virtual reality applications; and
providing, in a virtual environment based on the first non-virtual reality event notification and a second non-virtual reality event notification, a first non-textual indication and a second non-textual indication of a status of the respective non-virtual reality application, wherein a characteristic of at least one of the first non-textual indication or the second non-textual indication is adjusted to indicate the status of the respective non-virtual reality application, the characteristic of at least one of the first non-textual indication or the second non-textual indication being a quantity of a type of virtual object displayed in the virtual environment to indicate a corresponding number of non-virtual reality events of the respective non-virtual reality application, the quantity of the type of virtual object being more than one displayed virtual object.

2. The method of claim 1, wherein receiving, from the plurality of non-virtual reality applications, the first non-virtual reality event notification or the second non-virtual reality event notification includes at least one of:
- an indication of a receipt of an email by an email application;
- an indication of a receipt of a text message by a text messaging application;
- an indication of a receipt of a message by a social media or messaging application; or
- an indication of an upcoming calendar event.

3. The method of claim 1, wherein the characteristic of the first non-textual indication or the second non-textual indication further includes at least one of:
- a size of a type of virtual object displayed in the virtual environment is adjusted to indicate a number of non-virtual reality events for at least one of the plurality of non-virtual reality applications;
- a volume of a sound output in the virtual environment is adjusted to indicate a number of non-virtual reality events for at least one of the plurality of non-virtual reality applications;
- a brightness of a portion of a display screen to display the virtual environment is adjusted to indicate a number of non-virtual reality events for at least one of the plurality of non-virtual reality applications;
- a volume of a sound output in the virtual environment environments is adjusted to indicate a timing of a non-virtual reality event for at least one of the plurality of non-virtual reality applications; or
- a brightness of a portion of a display screen to display the virtual environment is adjusted to indicate a timing of a non-virtual reality event for at least one of the plurality of non-virtual reality applications.

4. The method of claim 1, wherein the characteristic of the first non-textual indication or the second non-textual indication further includes at least one of:
- the quantity of the type of virtual object displayed in the virtual environment is adjusted to indicate a number of new non-virtual reality events that have been received by at least one of the plurality of non-virtual reality applications; or
- the quantity of the type of virtual object displayed in the virtual environment is adjusted to indicate a total number of pending non-virtual reality events for at least one of the plurality of non-virtual reality applications.

5. The method of claim 1, wherein the characteristic of the first non-textual indication or the second non-textual indication further includes:
- a first quantity of a first type of virtual objects displayed in the virtual environment is adjusted to indicate a first number of non-virtual reality events for a first non-virtual reality application; and
- a second quantity of a second type of virtual objects displayed in the virtual environment is adjusted to indicate a second number of non-virtual reality events for a second non-virtual reality application.

6. The method of claim 1, wherein the characteristic of the first non-textual indication or the second non-textual indication further includes:
- a first characteristic of a type of virtual objects displayed in the virtual environment is adjusted to indicate a first number of non-virtual reality events for a first non-virtual reality application; and
- a second characteristic of the type of virtual objects displayed in the virtual environment is adjusted to indicate a second number of non-virtual reality events for a second non-virtual reality application.

7. The method of claim 1, wherein providing the first non-textual indication or the second non-textual indication of the status of the respective non-virtual reality application includes:
- displaying, in the virtual environment by the plurality of non-virtual reality applications, a number of virtual objects, where the number of the displayed virtual objects indicates or is based upon a number of non-virtual reality events.

8. The method of claim 1, further comprising:
- receiving a selection of the first non-textual indication or the second non-textual indication to be provided in the virtual environment by the respective non-virtual reality application.

9. The method of claim 8, wherein the receiving a selection of an indication comprises:
- receiving a selection of a type of virtual object to be displayed as the first non-textual indication or the second non-textual indication.

10. The method of claim 8, further comprising:
- receiving an indication of the characteristic of the first non-textual indication or the second non-textual indication to be adjusted to indicate the status of the respective non-virtual reality application.

11. The method of claim 1, wherein a quantity of virtual objects to be displayed for the first non-textual indication or the second non-textual indication is adjusted to indicate a number of non-virtual reality events.

12. A system, comprising:
- a computing device configured to generate an immersive virtual environment, the computing device including:
  - a memory storing executable instructions; and
  - a processor configured to execute the instructions to cause the computing device to:
    - receive, from a plurality of non-virtual reality applications, a first non-virtual reality event notification and a second non-virtual reality event notification, the first non-virtual reality event notification being associated with a first non-virtual reality application from the plurality of non-virtual reality applications and the second non-virtual reality event notification being associated with a second non-virtual reality application from the plurality of non-virtual reality applications; and
    - provide, in a virtual environment based on the first non-virtual reality event notification and the second non-virtual reality event notification, a first non-textual indication and a second non-textual indication of a status of the respective non-virtual reality application,
    - wherein a characteristic of the first non-textual indication and the second non-textual indication is adjusted to indicate the status of the non-virtual reality application, the characteristic of the first non-textual indication being a size of a first type of virtual object displayed in the virtual environment to indicate a corresponding number of non-virtual reality events of the first non-virtual reality application, and the characteristic of the second non-textual indication being a quantity of a second type of a virtual object displayed in the virtual environment to indicate a corresponding number of non-virtual reality events of the second non-virtual reality application, the first type of virtual object of the first non-textual indication being the same as the second type of virtual object of the second non-textual indication.

13. A method, comprising:

receiving a first non-virtual reality event notification and a second non-virtual reality event notification that each indicate an occurrence of a respective event in a plurality of non-virtual reality applications, the first non-virtual reality event notification indicating a first type and the second non-virtual reality event notification indicating a second type, the second type being different than the first type; and displaying, in a virtual environment based on the first non-virtual reality event notification and the second non-virtual reality event notification, a first non-textual indication including a first virtual object and a second non-textual indication including a second virtual object, a type of the first virtual object being different than a type of the second virtual object, the first non-textual indication and the second non-textual indication being immersive in the virtual environment and consistent with a theme of the virtual environment, wherein at least one of the first non-textual indication or the second non-textual indication being a quantity of the displayed virtual objects to indicate a corresponding number of occurrences of the event in the plurality of non-virtual reality applications.

14. The method of claim 13, wherein:

receiving the first non-virtual reality event notification indicates an occurrence of an event in a first non-virtual reality application, the first non-virtual reality event notification indicating a first quantity of events of a first event type;

receiving the second non-virtual reality event notification that indicates an occurrence of an event in a second non-virtual reality application, the second non-virtual reality event notification indicating a second quantity of events of a second event type, the second quantity of events being different from the first quantity of events.

15. The method of claim 14, wherein:

displaying, in the virtual environment based on the first non-virtual reality event notification, the first non-textual indication including a first quantity of virtual objects, wherein the first quantity of the displayed virtual objects is based on the first quantity of events; and displaying, in the virtual environment based on the second non-virtual reality event notification, the second non-textual indication including a second quantity of virtual objects that is different from the first quantity of the virtual objects, wherein the second quantity of the displayed virtual objects is based on the second quantity of events.

16. The method of claim 13, wherein:

receiving the first non-virtual reality event notification indicates an occurrence of an event in the first non-virtual reality application, the first non-virtual reality event notification indicating a first event type and a first quantity of events; and receiving the second non-virtual reality event notification indicates an occurrence of an event in the second non-virtual reality application, the second non-virtual reality event notification indicating a second event type and a second quantity of events.

17. The method of claim 16, wherein:

displaying, in the virtual environment based on the first non-virtual reality event notification, the first non-textual indication including a first quantity of a first type of virtual objects, wherein the first quantity of the first type of virtual objects is based on the first quantity of events of the first event type; and displaying, in the virtual environment based on the second non-virtual reality event notification, the second non-textual indication including a second quantity of a second type of virtual objects, wherein the second quantity of the second type of virtual objects is based on the second quantity of events of the second event type.

18. The method of claim 13, wherein receiving the first non-virtual reality event notification or the second non-virtual reality event notification that indicates the occurrence of the event in the plurality of non-virtual reality applications includes at least one of:

an indication of a receipt of an email by an email application;

an indication of a receipt of a text message by a text messaging application;

an indication of a receipt of a message by a social media or messaging application; or an indication of an upcoming calendar event.

* * * * *